UNITED STATES PATENT OFFICE.

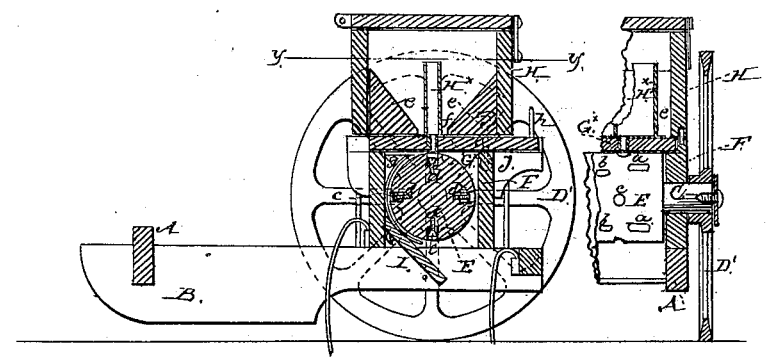

C. E. STELLER, OF GENESEE, WISCONSIN.

IMPROVEMENT IN SEEDING-MACHINES.

Specification forming part of Letters Patent No. 37,465, dated January 20, 1863.

*To all whom it may concern:*

Be it known that I, C. E. STELLER, of Genesee, in the county of Waukesha and State of Wisconsin, have invented a new and Improved Seeding-Machine; and I do hereby declare that the following is a full, clear, and exact description of the same, reference being had to the accompanying drawings, forming a part of this specification, in which—

Figure 1 represents a longitudinal vertical section of my invention, the plane of section being indicated by the line $x\ x$, Fig. 2. Fig. 2 is a horizontal section of the same, taken in the plane indicated by the line $y\ y$, Fig. 1. Fig. 3 is a partial transverse vertical section of the same, the plane of section being indicated by the line $z\ z$, Fig. 2. Figs. 4 and 5 are detached plan views of the slides used for distributing different kinds of seed.

Similar letters of reference in the several figures indicate corresponding parts.

The object of this invention is to construct a simple and effective seeding-machine capable of sowing seeds of different kinds—such as barley and oats, wheat and rye, or timothy and clover, or other small seeds—either in drills or broadcast, or to plant corn in newly-cultivated or in old land, as may be desired, and which can be drawn along with a comparatively small power.

The invention consists in the arrangement of a rotary cylinder, with several rows of different-sized adjustable seed-cells, in combination with and close under a transversely-adjustable slide provided with several rows of openings corresponding to the seed-cells in the rotary cylinder in such a manner that by the motion of said cylinder close under the openings in the slide the discharge of the seed through said openings into the seed-cells is facilitated; and, furthermore, by changing the position of the slide a new set of seed-cells can be brought into operation and the distributing device adapted to larger or smaller seed, as occasion may require.

It consists, also, in the arrangement of one or more secondary hoppers in the interior of the main hopper, in combination with openings in the movable slide or hopper bottom, and with seed-cells of different size in a cylinder rotating close under the slide or hopper bottom in such a manner that two kinds of seed of different size—such as wheat or rye and timothy or clover—can be sown simultaneously from the same machine.

To enable those skilled in the art to make and use my invention, I will proceed to describe its construction and operation with reference to the drawings.

A represents a frame, made of timber or any other suitable material, and provided in front with rollers B, which may form a part of the longitudinal timbers of the frame, as clearly represented in Fig. 1 of the drawings, or which may be attached to the frame in any other desirable manner. The rear part of the frame A is suspended from the axle C of two wheels, D D'. The axle passes through the distributing-roller E, and one of the wheels, D, is rigidly connected to the axle, whereas the other wheel, D', turns loosely on the same. By the motion of the wheel D a rotary motion is imparted to the roller E, and at the same time by attaching the wheel D' loosely to the axle the machine can be turned easily and without undue strain to any of its parts.

The roller E is inclosed in a box, F, and it is provided with two or more rows of seed-cells, $a\ b\ c$, of different size—one to plant corn, one to distribute barley and oats or wheat and rye, and the last to distribute timothy and clover seed. Each of the seed-cells is furnished with a screw-plug, $d$, the head of which fits closely into the cell, so that by screwing said plugs in or out the capacity of the seed-cells is increased or diminished, or that either one of the seed-cells can be stopped up entirely whenever it is desirable.

The different rows of seed-cells are arranged on different circles on the circumference of the roller, so that the cells of one of the rows are situated on circles between those of the other rows, and a slide, G, or G', or G*, serves to admit the seed from the hopper H into either one or all the seed-cells or to shut it off from the same at pleasure. Said slide is inserted between the box F and hopper H, the bottom of the latter being constructed of two triangular strips, $e$, inserted so as to conduct the seed from the hopper toward a central crevice, $f$, extending through the whole length of the hopper. The roller E moves close under the slide G, G', or G*, and by its motion a clogging of the holes or apertures in the slide is prevented, and at the same time by the edges of said holes or apertures any surplus seed is swept from the seed-cells and the distribution of the seed is rendered uniform.

The slide G, Fig. 4, is provided with two rows of holes, $b'$ $c'$, corresponding in size and position to the seed-cells $b$ $c$ for rye, wheat, and grass seeds, and the slide G', Fig. 5, is provided with a slot, $a'$, extending through the whole length of the hopper, and with two square apertures, $a^*$, near to the ends and corresponding in position to the extreme circle of seed-cells $a$. The slot $a'$ and apertures $a^*$ are in such relation to each other that either the one or the other can be brought under the crevice in the bottom of the hopper, and that when the apertures $a^*$ come into operation the slot $a'$ is covered by one of the triangular strips $e$, and no seed is permitted to escape from the hopper except through said apertures, and vice versa. The slot $a'$ is brought into use for sowing oats and barley or similar seeds, and as the roller rotates under the slide the seed readily drops into the cells $b$, the cells $c$ being too small to receive the kernels.

For planting corn the apertures $a^*$ are brought in use, and the edges of the apertures are protected by india-rubber strips $a^2$, so that the kernels are not liable to be injured when caught between said edges and the edges of the corresponding cells, $a$, in the roller E. The corn which drops into these seed-cells is retained by a semicircular guard, $g$, Fig. 1, which encircles one-half of the circumference of the roller, and it is not permitted to escape from either of said cells until the latter are brought in an inverted vertical position.

The slide G*, Fig. 2, is used when it is desired to sow two kinds of seed of different size—such as wheat and timothy—and in order to effect this purpose said slide is provided with a series of holes, $b^*$ $c^*$, of different size arranged in one row, the holes $b^*$ to correspond in position to the cells $b$ and the holes $c^*$ to the cells $c$ in the roller. Secondary hoppers or tubes, H*, are inserted into the holes $c^*$ between the holes $b^*$, as clearly shown in Fig. 2 of the drawings, and if the main hopper, H, is filled with wheat and the secondary hoppers, H*, with timothy-seed the cells $b$ take and distribute the former and the cells $c$ the latter seed, and both kinds of seed are distributed simultaneously.

The slides G G' are adjusted in the desired position by pins $h$ passing through different holes in arms $i$ $i'$, extending from the slides, and through holes in lugs $j$, projecting from the rear side of the box F, and by bringing said slides in the proper position either set of seed-cells may be brought in operation, or the seed may be cut off altogether. The slide G* is retained in the working position by the secondary hoppers, H*, and by pins $h$ passing through the ends of said slide and into the lugs $j$.

The seed on being discharged from the seed-cells drops on the distributing-board I, which scatters the same, and which is used when it is desired to sow broadcast. This board is not used when the seed is to be sown in drills or hills.

The ground is opened and prepared for receiving the seed by suitable cutters and furrowing-shares, and after the seed is deposited on the ground it is covered up by covering-shares or any other suitable device, and the ground is leveled by a drag or harrow.

It is desirable to attach all the implements required for opening the ground, distributing the seed, and covering it up when deposited to the same frame, so that the horses have not to tramp over the ground again, one operation being sufficient to effect the desired result.

Having thus fully described my invention, what I claim as new, and desire to secure by Letters Patent, is—

1. The arrangement of one or more transversely-adjustable slides, G G' G*, with two or more sets of holes or apertures, $b'$ $c'$ $a'$ $a^*$, in combination with the seed-distributing roller E, rotating close under said slide or slides, and provided with adjustable seed-cells $a$ $b$ $c$, all constructed and operating in the manner and for the purpose set forth.

2. The arrangement of the secondary hopper, H*, in combination with the main hopper, H, slide G*, and seed-distributing roller E, constructed and operating as and for the purpose specified.

C. E. STELLER.

Witnesses:
H. A. STELLER,
F. G. TYTHERLEIGH.